(12) United States Patent
Hoeksma

(10) Patent No.: US 6,271,835 B1
(45) Date of Patent: Aug. 7, 2001

(54) TOUCH-SCREEN INPUT DEVICE

(75) Inventor: Henry Hoeksma, Kinburn (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/146,232

(22) Filed: Sep. 3, 1998

(51) Int. Cl.[7] .................................................... G09G 5/00
(52) U.S. Cl. .......................... 345/168; 345/169; 345/171; 345/179
(58) Field of Search ................................ 345/168, 169, 345/171, 172, 179

(56) References Cited

U.S. PATENT DOCUMENTS

| | | |
|---|---|---|
| 4,333,097 | 6/1982 | Buric et al. . |
| 4,680,728 | 7/1987 | Davis, II et al. . |
| 4,725,694 | 2/1988 | Auer et al. . |
| 5,003,503 | 3/1991 | Lapeyre . |
| 5,006,001 | 4/1991 | Vulcano . |
| 5,258,748 | 11/1993 | Jones . |
| 5,288,158 | 2/1994 | Matias . |
| 5,379,057 | 1/1995 | Clough et al. . |
| 5,574,482 | 11/1996 | Niemeier . |
| 5,583,497 | 12/1996 | Hankes . |
| 5,956,021 | * 9/1999 | Kubota et al. ..................... 345/179 |

* cited by examiner

Primary Examiner—Richard Hjerpe
Assistant Examiner—Duc Dinh
(74) Attorney, Agent, or Firm—Jeff Measures

(57) ABSTRACT

A touch screen input device for improving the input of alphanumeric data in an area of limited space. The input device employs a multi-touch method of input which is intuitive to a first time user. The device maps a plurality of characters to each of its input keys and upon selection of a key subsequently re-labels the input keys with the characters displayed on the selected key. The device is intuitive to a first time user since the input keys are re-labeled in manner which corresponds to their relative position within the selected input key. In comparison to single stroke input devices this device reduces the number of keys required for data input. Alternatively a user could select a single character without employing the multi-touch method by selecting a pre-defined element of a particular input key.

14 Claims, 6 Drawing Sheets

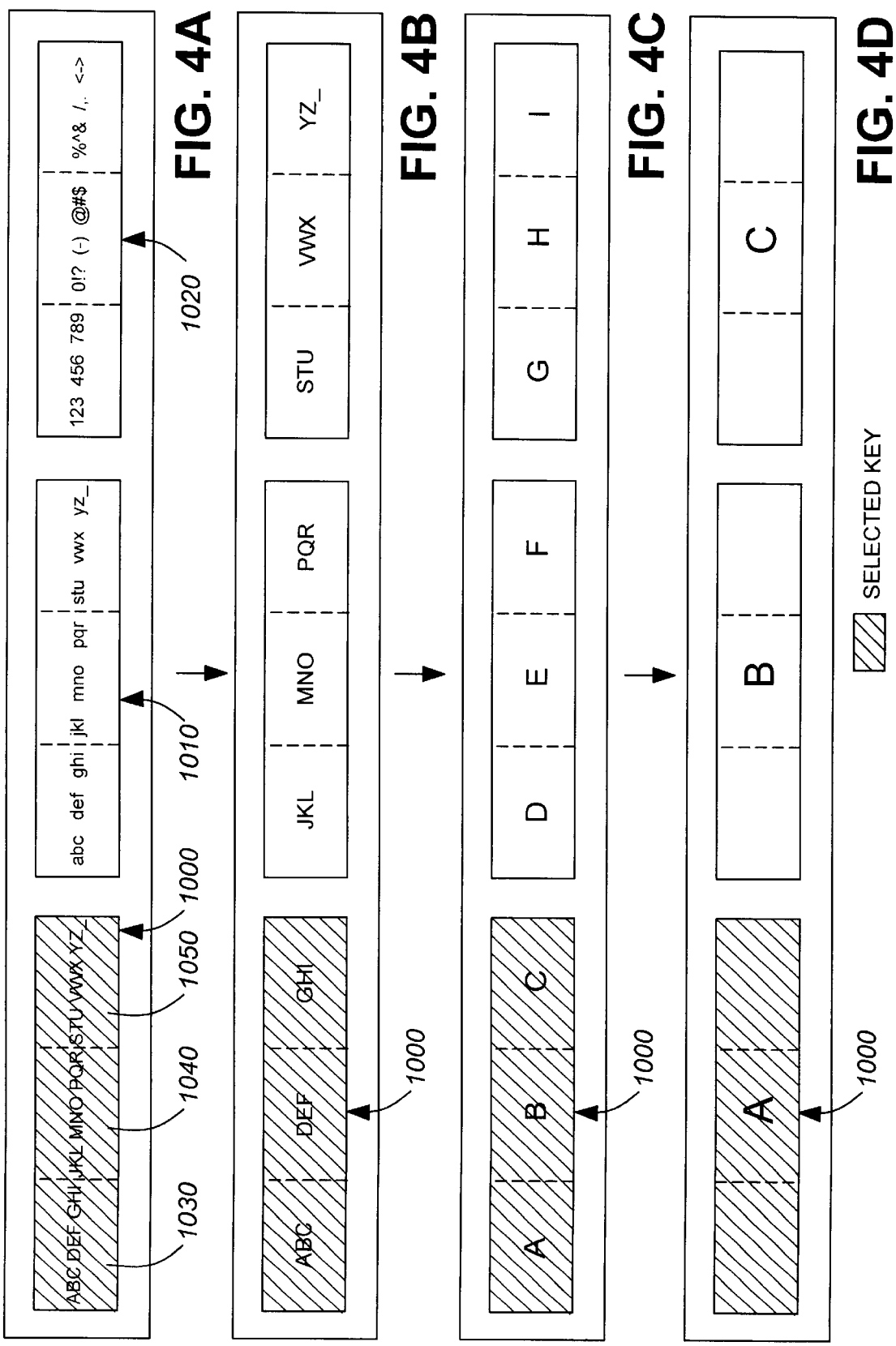

TOUCH-SCREEN INPUT DEVICE

FIELD OF THE INVENTION

The present invention relates to touch-screen devices for the input of alphanumeric data generally, and specifically to touch-screen devices with limited input space. In particular, the invention relates to methods and apparatus for inputting said data.

BACKGROUND OF THE INVENTION

It is well known to input alphanumeric data using a single stroke keyboard, for example, to a personal computer. A "QWERTY" keyboard is a well known keyboard wherein each key represents a particular character, the first six being labelled QWERTY from left to right. Disadvantages of such an input device include the amount of space required for the keyboard and the non-intuitive arrangement of the keys therein. The required space for a keyboard is typically limited by the number of keys necessary for the characters to be made available and the key space necessary to maintain reliable data input, i.e. to avoid multiple keys being depressed.

It is possible, however, to reduce the size of an input device, i.e. a keyboard, without reducing the number of characters which can be selected. This can be accomplished either by (i) reducing the size of the keys themselves or (ii) decreasing the number of keys and increasing the number of keystrokes. Reducing the size of the keys, however, is not a practical solution due to the aforementioned problem of multiple key depression. A "QWERTY" keyboard employed in a wireless handset, for example, would require the user to exhibit considerable accuracy in selecting the desired character. Therefore, in order to meet both requirements, one must use an input device that requires multiple keystrokes.

Prior art devices take advantage of the fact that the same number of characters on a single stroke keyboard can be made available on a keyboard with fewer keys by incorporating multiple keystrokes.

As an example of such a prior art device, the reader is directed to U.S. Pat. No. 5,003,503, issued Mar. 26, 1991, naming Lapeyre as inventor, the disclosure of which is hereby incorporated by reference. The Lapeyre patent provides for a 7 and 12 key input device that works on the general premise that a first key stroke identifies a group of characters from which a character is selected by a second key stroke. The drawbacks of such an arrangement are twofold.

First, the location of a character within its respective group of characters does not determine the second keystroke key which must be pressed to select the character. This arrangement, similar to the "QWERTY" keyboard, results in a non-intuitive method of data input in which the user must search for the appropriate selection key. Such a device therefore requires extensive use in order for a user to become familiar with its input arrangement, thus making the device cumbersome for a first time or periodic user.

Second, as a result of all available characters and their corresponding secondary keystroke number being labelled on the keys, the Lapeyre device is very cluttered and difficult to read. Again, this increases the input difficulty for a first time or periodic user.

There exists, therefore, a need for providing a clear and intuitive method of data input in an area of limited space.

SUMMARY OF THE INVENTION

It is an object of the present invention to provide a touch-screen device for the input of alphanumeric data in a manner which is intuitive to a first time or periodic user without requiring a separate key for every character. According to one aspect of the invention this objective is met by mapping sub-arrays or groups of characters to input keys wherein successive keystrokes can uniquely identify every character therein. Said input keys are not mechanical as are those on a traditional keyboard but are rather input surfaces selectable by pressing a pre-defined area of the touch-screen with one's finger. The characters mapped to said keys include alphanumeric characters, symbols and function characters; a function character being a character which represents a function such as backspace, tab or done for example.

One application of said touch-screen input device is for use in a wireless handset where there exists an obvious space limitation given the recent trend towards smaller handsets. In said application the keys necessary for the input of alphanumeric data must be large enough to be reliably selected by a user's finger. A touch-screen device utilizing a multi-stroke input sequence with a minimal number of keys is thus required—a typical 92 key keyboard being impractical in said application.

According to one embodiment, the input keys displayed on said touch-screen input device are divided into a plurality of elements, wherein the number of elements per key is less than or equal to the total number of input keys. Said elements are positioned within their respective input key to correspond to the relative position of the input keys within the input area of the touch screen. Individual characters are mapped to each individual element. Said characters include alphanumeric data, symbols and characters representing a function. To select a character a user would first select an input key displaying a group of characters, one of which is the desired character. Such a selection occurs when the user touches a plurality of elements on the same input key. Responsive to selecting a desired key, each input key is subsequently re-mapped with the characters contained within said selected key. The re-mapping process occurs such that each character is re-mapped to the key whose relative position within the input area corresponds to the relative position of said characters within the selected input key. The user then selects, with a subsequent keystroke, the desired character from the input keys re-mapped with the individual characters. This re-mapping provides a user friendly interface to first time and periodic users as the appropriate key is always labelled with the desired characters from each keystroke.

Preferably a second method of data input can be offered to the user. In addition to the two keystroke method previously discussed a single stroke method can also be employed. With respect to said single keystroke method a user can input a single character directly by touching only the individual element to which the desired character has been mapped without touching any other elements on the key. Given the size of the elements within the keys, such a single keystroke would typically require fine control by the user. This can be facilitated by means of a finely tipped instrument, for example a stylus.

First time and periodic users are further benefited by the present invention given that the character layout and the input sequence are intuitive i.e. user friendly.

One aspect of the invention provides for a touch-screen device comprising: a touch screen; means for displaying on said touch-screen a plurality of input keys; means for mapping a plurality of characters to each input key; means for determining whether an input designates a single character or a re-map command; means for re-mapping said input keys responsive to a re-map command input; means for selecting a character responsive to an input designating a particular character.

BRIEF DESCRIPTION OF THE DRAWINGS

The present invention, together with further objects and advantages thereof will be further understood from the following description of the preferred embodiments with reference to the drawings in which:

FIG. 4 is a series of schematic diagrams illustrating the input sequence, as the result of character key inputs, of a touch-screen input device according to an alternate embodiment of the invention.

DETAILED DESCRIPTION OF THE PREFERRED EMBODIMENTS

The present invention will be described with respect to a preferred embodiment used in a wireless handset. It should appreciated by a person skilled in the art that the invention can also be utilized in other devices, for example, a personal organizer, a wrist watch, a pager, etc. which require periodic data input given a limited amount of space.

Figure 1:
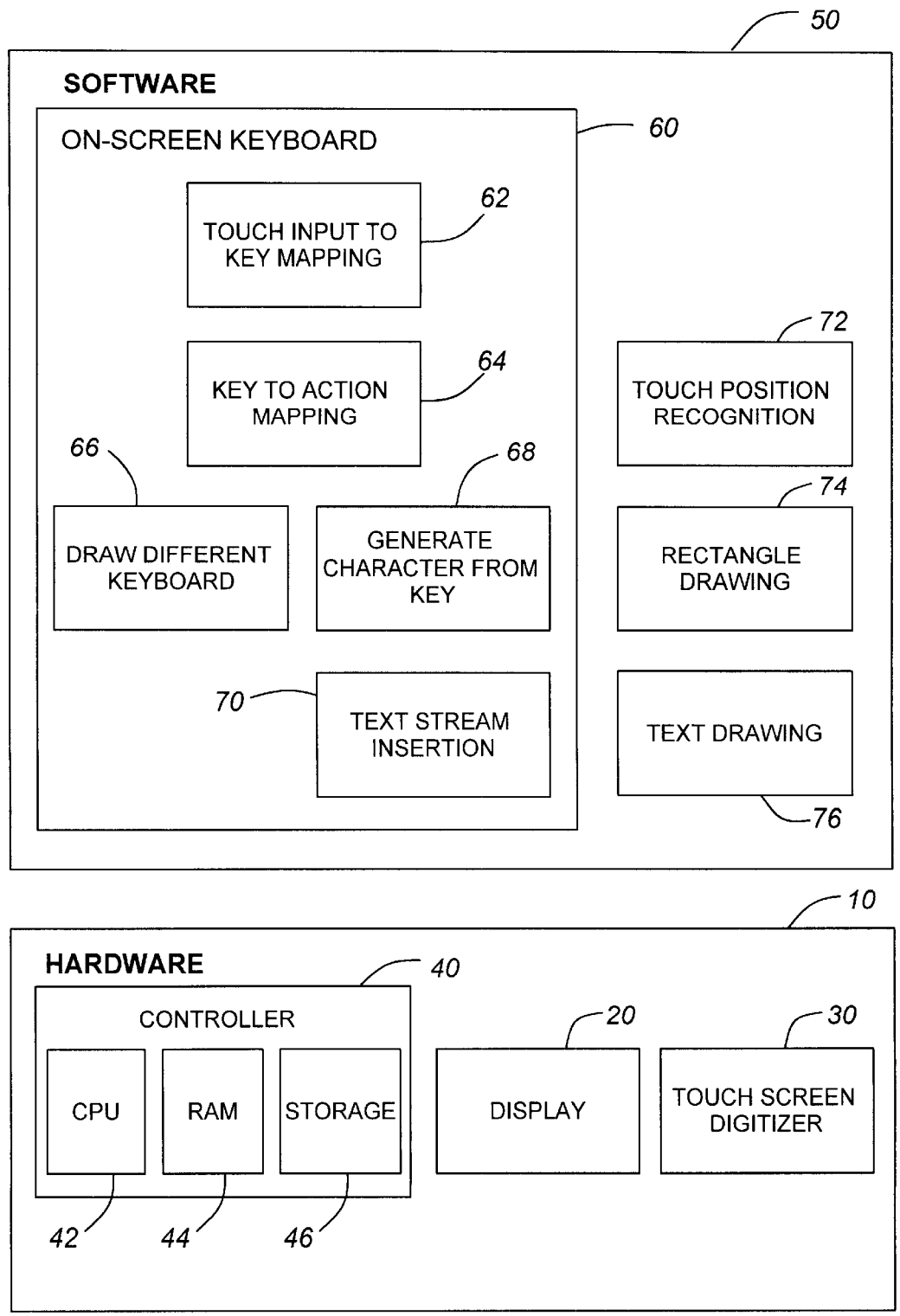
FIG. 1 is a block diagram showing the hardware and software components of a touch-screen input device according to a preferred embodiment of the invention.

By way of example, FIG. 1 illustrates a touch-screen input device according to a preferred embodiment of the invention. Said device includes hardware 10 comprising a display 20, a touch screen digitizer 30, and a controller 40. Said controller further comprises a micro-processor 42, and associated memory 44, for example, operating memory (eg. RAM), and software storage 46. The function of said controller 40 is to control the touch screen digitizer 30 and the display 20, responsive to the software 50. Said software comprises eight sub-routines, five of which are used for operating the on-screen keyboard 60. The five sub-routines employed in the on-screen keyboard include: touch input to key mapping 62—which translates the location of a touch on the screen into an identification of which on-screen element(s) were pressed; key to action mapping 64—which, responsive to on-screen element(s) being pressed, performs the associated action; draw different keyboard 66—which re-displays the on-screen keys with new labels as determined by the key to action mapping sub-routine 64; generate character from key 68—which determine which particular character has been selected; and text stream insertion 70—which inserts the selected character into the devices keyboard input stream so that other software recognizes the character as coming from a regular keyboard. The remaining three sub-routines are part of the system software which is necessary to support the on-screen keyboard. These remaining sub-routines include: touch position recognition 72—which translates inputs to the touch-screen digitizer into screen co-ordinates; rectangle drawing 74—which draws the rectangles use to represent the various keys on the touch-screen; and text drawing 76—which draws the text characters onto the screen.

Figure 2:
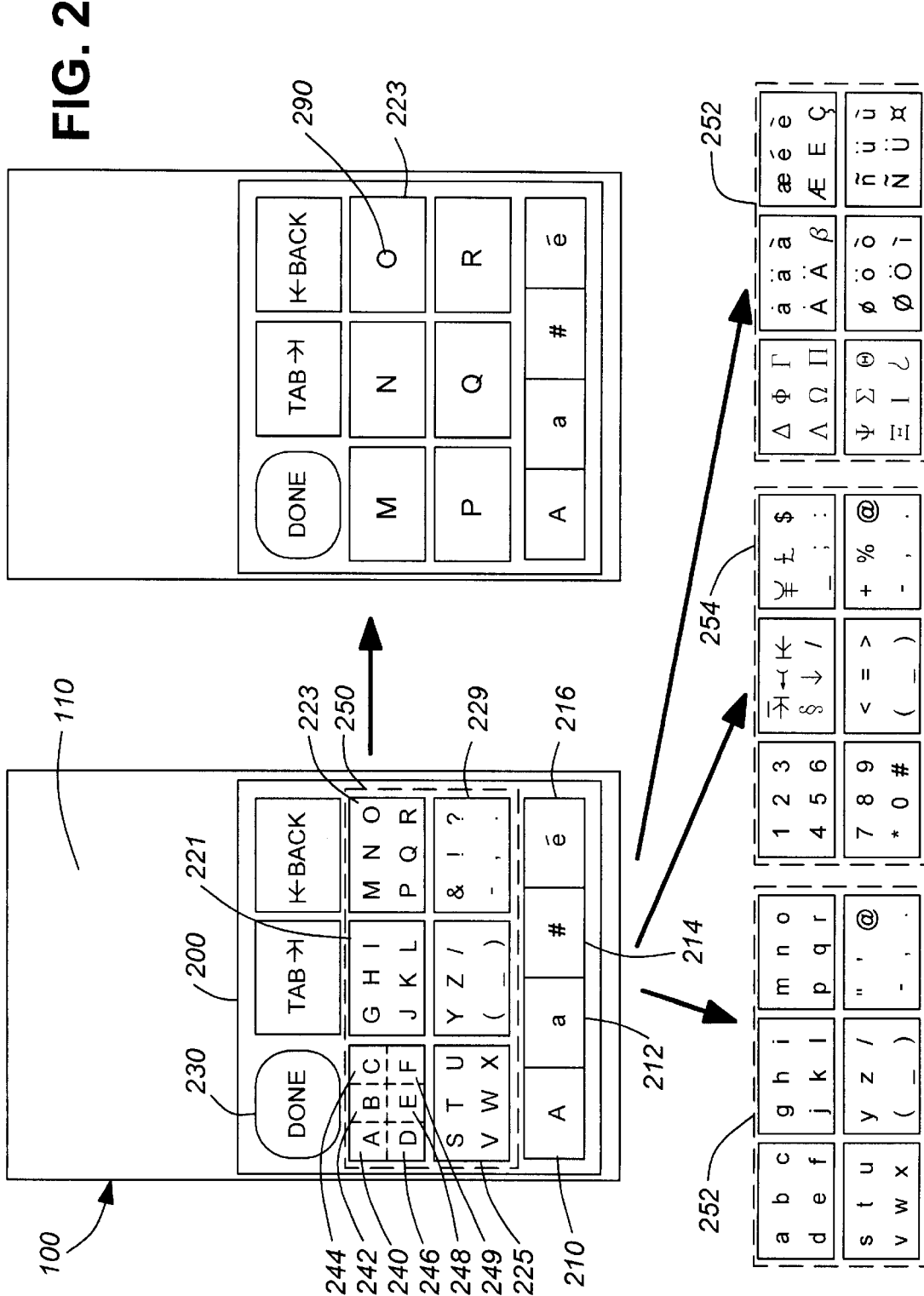
FIG. 2 is a schematic diagram showing a touch-screen input device display layout according to a preferred embodiment of the invention.

With further reference to FIG. 2, a preferred embodiment of the method steps expected by said controller as directed by said software will be described in detail.

An example of a touch screen input device layout 100 according to a preferred embodiment of the invention is shown in FIG. 2. Said input device is comprised of a text display area 110 and an on-screen keyboard 200 wherein said keyboard is divided into a plurality of keys. Said keys include four assignment keys 210, 212, 214, and 216; six character keys 220, 221, 223, 225, 227, and 229; and a "done" key 230 for terminating data input capabilities. With respect to the character keys, said keys are further divided into six elements each of which can preferably be individually selected. For example character key 220 is divided into elements 240, 242, 244, 246, 248, and 249 and is initially mapped with the characters A, B, C, D, E, and F respectively. The position of the elements within their respective character key corresponding to the relative positioning of the character keys themselves.

In operation the character keys are capable of being re-mapped either as a result of an assignment key being input or the input of more than one element of a specific character key when individual characters are mapped to the character elements. Assignment keys 210, 212, 214,and 216 determine which of the alternative character arrays 250, 252, 254 or 256 are mapped to the character keys. This results in a new group of six characters specific to the chosen character array 250 being displayed on each of the character keys. Note that in FIG. 2, the character array designated by assignment key 210 is shown mapped to the character keys. However, if assignment key 212 is pressed, a re-map command is issued to re-map the character keys with the lower case character array 252. Responsive to an input of a character key 223 wherein individual characters are mapped to each of the elements, said character keys are re-mapped with the individual characters included within said selected character key 223. In this example, key 223, the upper right most character key, will be re-mapped with the letter 'O' 290, the character which was mapped to the element of the selected key 223 whose position corresponds to said character keys, i.e. the upper right most element. This re-mapping results from the input of multiple elements on the same character key 220. Once re-mapped in this manner a user could then select an individual character by the input of any number of elements on the character key 225 which has the desired individual character mapped to it.

Preferably, a user could alternatively select a specific character directly without a re-mapping step by limiting the input to a single element containing the desired character. This would occur at the stage when individual characters are mapped to said character key elements 240 and would by accomplished, for example, by means of a stylus which can be used to press a single element only.

Figure 3:
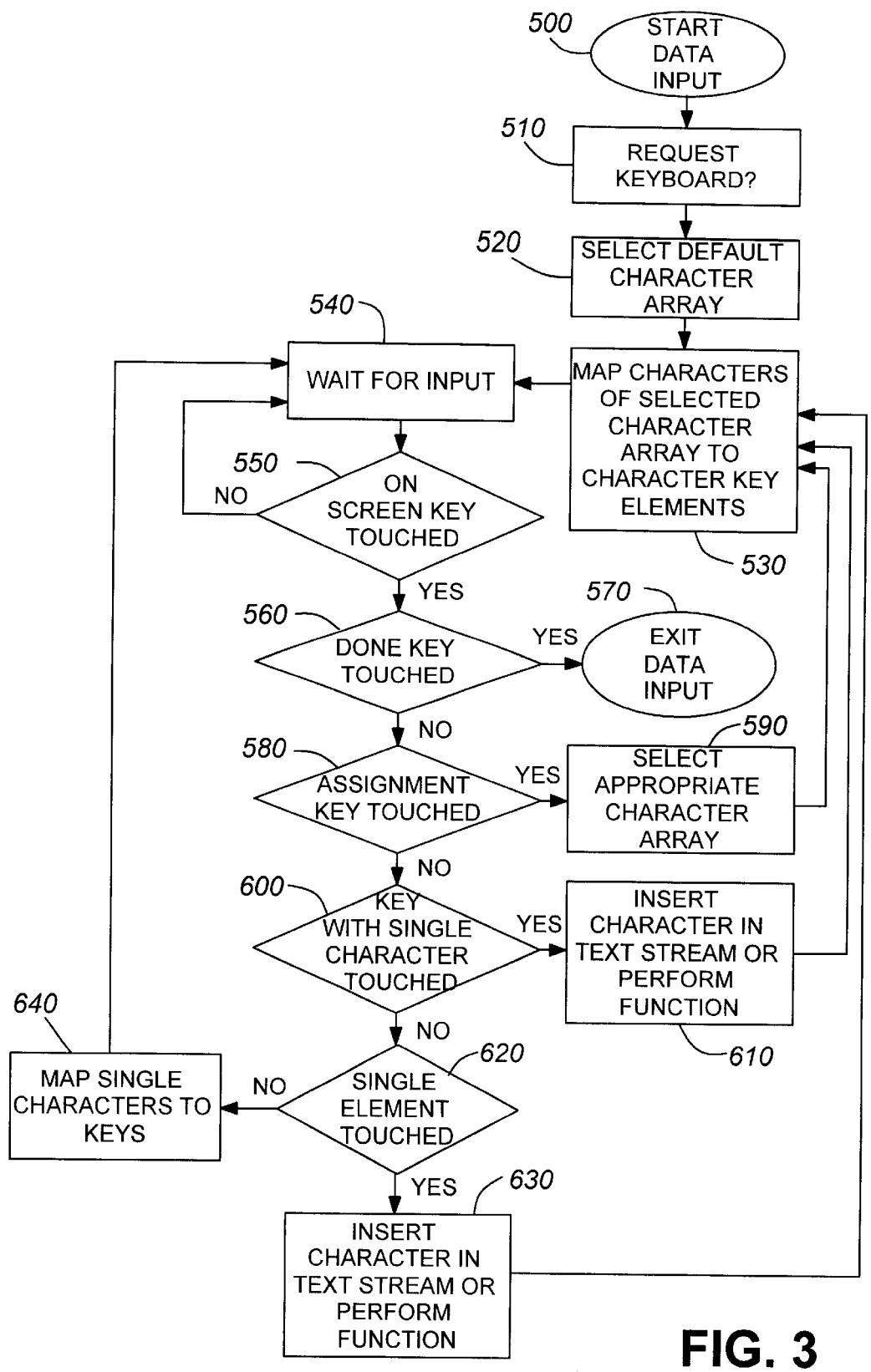
FIG. 3 is a flow diagram illustrating the process carried out by the touch-screen input device software according to a preferred embodiment of the invention.

FIG. 3 is a flow diagram outlining the data input steps implemented by the controller 40. With reference to FIG. 3, once the touch-screen input device is notified in a suitable manner that data input is requested by the user, the initialization sequence begins 500. The controller displays the touch-screen keyboard 510 and selects a default array of characters 520 which are mapped to the character key elements 530. At this stage the input sequence begins with the controller waiting for a user input 540. Upon receiving an input of any kind, i.e. the screen is touched, the micro-controller identifies the position of said input, via the touch screen digitizer and the touch position recognition software described in FIG. 2. From this the controller determines whether an on-screen key has been touched 550. If the position of the input, i.e. the user's finger or stylus, does not correspond to the position of a key, the waiting process 540 is re-initiated. Otherwise, the controller proceeds to determine whether the command key "done" was touched 560. If said determination is positive the data input sequence terminates 570. If said determination is negative the controller determines whether an assignment key was touched 580. Responsive to an assignment key being touched, controller selects the appropriate character array 590, and re-maps the characters included in said array to the elements of the character keys 530 and re-starts the input sequence by waiting for an input 540. An input of a key other than an assignment key will prompt the controller to inquire whether a key with a single character on it was input 600. If a key with a single character on it was input, the controller inserts that character into the text stream or performs the function associated with said character 610 and, after resetting the original mapping of the characters of the appropriate array to the input key elements 530, re-starts the input sequence 540. If the key input did not have a single character displayed on it, the controller determines whether a single element of a character key was input 620. If a single element was input the controller inserts that character into the text stream or performs the function associated with that character 630 and, after re-labelling 530 has occurred, re-starts the input sequence 540. If a single element was not input, the micro-controller maps single characters to the input keys 640 and restarts the input sequence by waiting for an input 540.

One should note that the assignment keys are not necessary for the functionality of the described invention. Said assignment keys merely offer the user an expanded number of available characters, analogous to a "shift" key on a "QWERTY" keyboard. Said keys could also be included as characters within the character keys as opposed to being distinct. One should also note that much like the assignment keys the "done" key shown in the aforementioned embodiment could be easily represented by a character mapped to a character key.

A person skilled in the art should appreciate that there are many ways of accomplishing the above described method of data input.

The description of the preferred embodiment disclosed above can easily be extended to include a multiple layer input method. This is beneficial where the constraint of space is greater than that previously discussed. For example, in small devices such as a pager, six keys may require more space then is available. A solution to this problem is achieved by increasing the number of input layers. Instead of having individual characters mapped to specific elements, arrays of characters could be used. For example, by using a four stroke touch-screen input device (two stroke if individual elements chosen) as shown in FIG. 4, three keys could provide $3^4$ or 81 characters. Although said keyboard is shown without the assignment keys as mentioned in the previous embodiment, said keys could be easily added to offer a greater number of available characters.

With respect to this alternate embodiment the hardware described previously in FIG. 1 would be the same. The software would contain similar sub-routines as those discussed previously but would be modified accordingly to implement the method that follows. A person skilled in the art should appreciate that the number of keys (and elements therein) and input layers chosen are for the purposes of example only. One could reduce the number of keys and increase the number of input layers or reduce the number of layers and increase the number of keys to obtain the optimum balance between key strokes and the number of keys—while maintaining a similar number of available characters.

FIGS. 4*a*, 4*b*, 4*c*, and 4*d* show four on-screen keyboards and demonstrate the input sequence as the result of character key inputs. One should recall that an input of a character key results from an input of a plurality of elements on the same character key. Each keyboard shown in FIGS. 4*a*, 4*b*, 4*c* and 4*d* comprise of a set of 3 character keys 1000, 1010, and 1020, wherein each character key is comprised of 3 elements. For example character key 1000 in FIG. 4*a* is divided into 3 elements 1030, 1040 and 1050, which are mapped with character sub-arrays A-I, J-R and S-_ respectively. Each set of character keys shown displays a different mapping of character to the character keys, each mapping representing a different input layer or order. FIG. 4*a* shows a keyboard displaying $3^{rd}$ order character sub-arrays mapped to said character keys. The order of the sub-array refers to the number of successive character key input steps (as opposed to element inputs) a user would have to perform in order to have single characters displayed on said character keys. FIG. 4*b*, 4*c* and 4*d* show b $2^{nd}$ order sub-arrays, $1^{st}$ order sub-arrays and particular characters mapped to the character keys respectively. FIGS. 4*a* through 4*d* show the re-mapping and selection process which occurs as the result of successively inputting character key 1000. Referring to FIG. 4*a* responsive to an input of character key 1000 to which a $3^{rd}$ order sub-array is mapped, the character keys are re-mapped with the corresponding $2^{nd}$ order sub-arrays as shown in FIG. 4*b*. Note that the characters mapped to the keys in FIG. 4*b* are, A-I, J-R and S-_, are those characters which were included in the $3^{rd}$ order sub-array of the selected character key 1000. At this stage, an input of the same character key 1000, which has the $2^{nd}$ order sub-array A-I mapped to it, results in a re-mapping of said character keys with the corresponding first order sub-arrays as shown in FIG. 4*c*. Yet another input of the same character key 1000, now mapped with the first order sub-array A-C, results in the corresponding individual characters being mapped to said character keys. The process ends with the input of character key 1000 which has the individual character 'A' mapped to it. Responsive to said input the character 'A' is inserted into the text stream. After the selection of an individual character said character keys are re-mapped with the default $3^{rd}$ order sub-arrays shown in FIG. 4*a* and the process begins again.

Figure 5A:
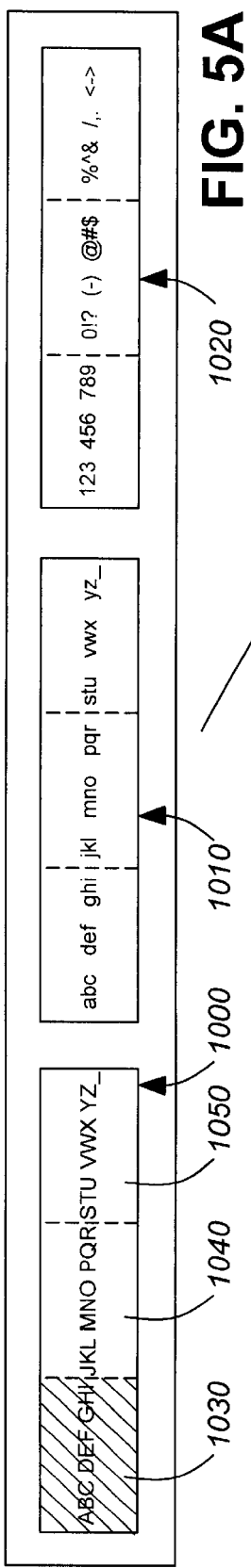
FIG. 5 is a series of schematic diagrams illustrating the input sequence, as the result of element inputs, of a touch-screen input device according to an alternate embodiment of the invention.
Figure 5B:
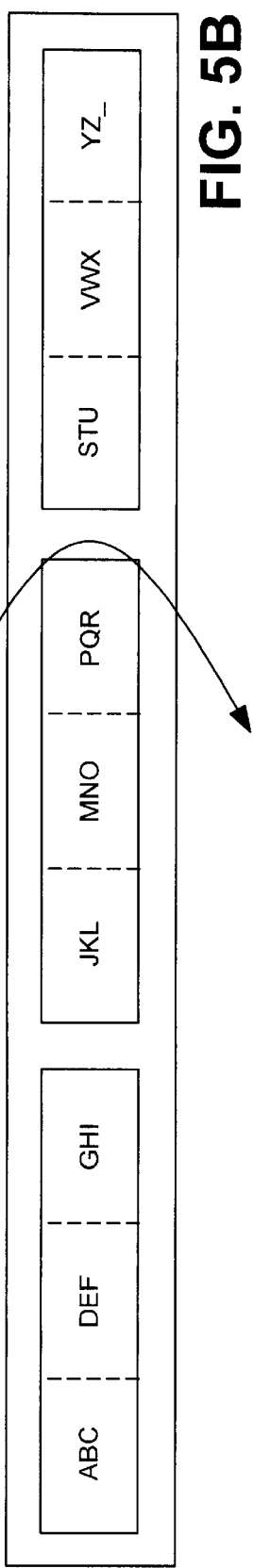
Figure 5C:
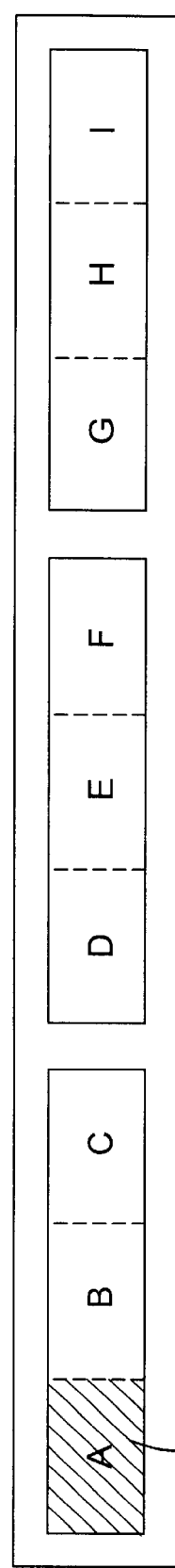
Figure 5D:
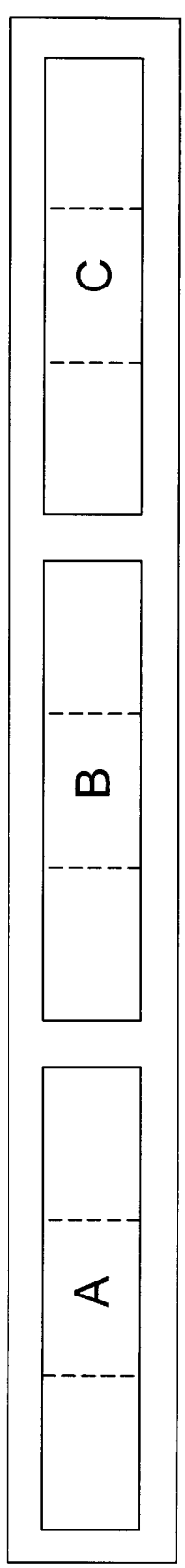

FIGS. 5*a*, 5*b*, 5*c*, and 5*d* show the same key layout as described in FIG. 4, but differ in that they demonstrate the method of re-mapping character keys as the result of a single element being input. Starting with $3^{rd}$ order sub-arrays mapped to the character keys as shown in FIG. 5*a*, an input of the single element 1030 results in the re-mapping of said character keys with the $1^{st}$ order sub-arrays which correspond to the selected element input. This is shown in FIG. 5*c*. Notice that the characters mapped to the selected character element 1030 in FIG. 5*a* (A-I) are now mapped to the character keys in FIG. 5*c*. At this stage an input of the same character element 1030 results in the selection of the character mapped to the selected element, which in this example is the letter 'A'. Said selected character is then inserted into the text stream.

The character keys are then re-mapped with the default $3^{rd}$ order sub-arrays as shown in FIG. 5a.

Figure 6:
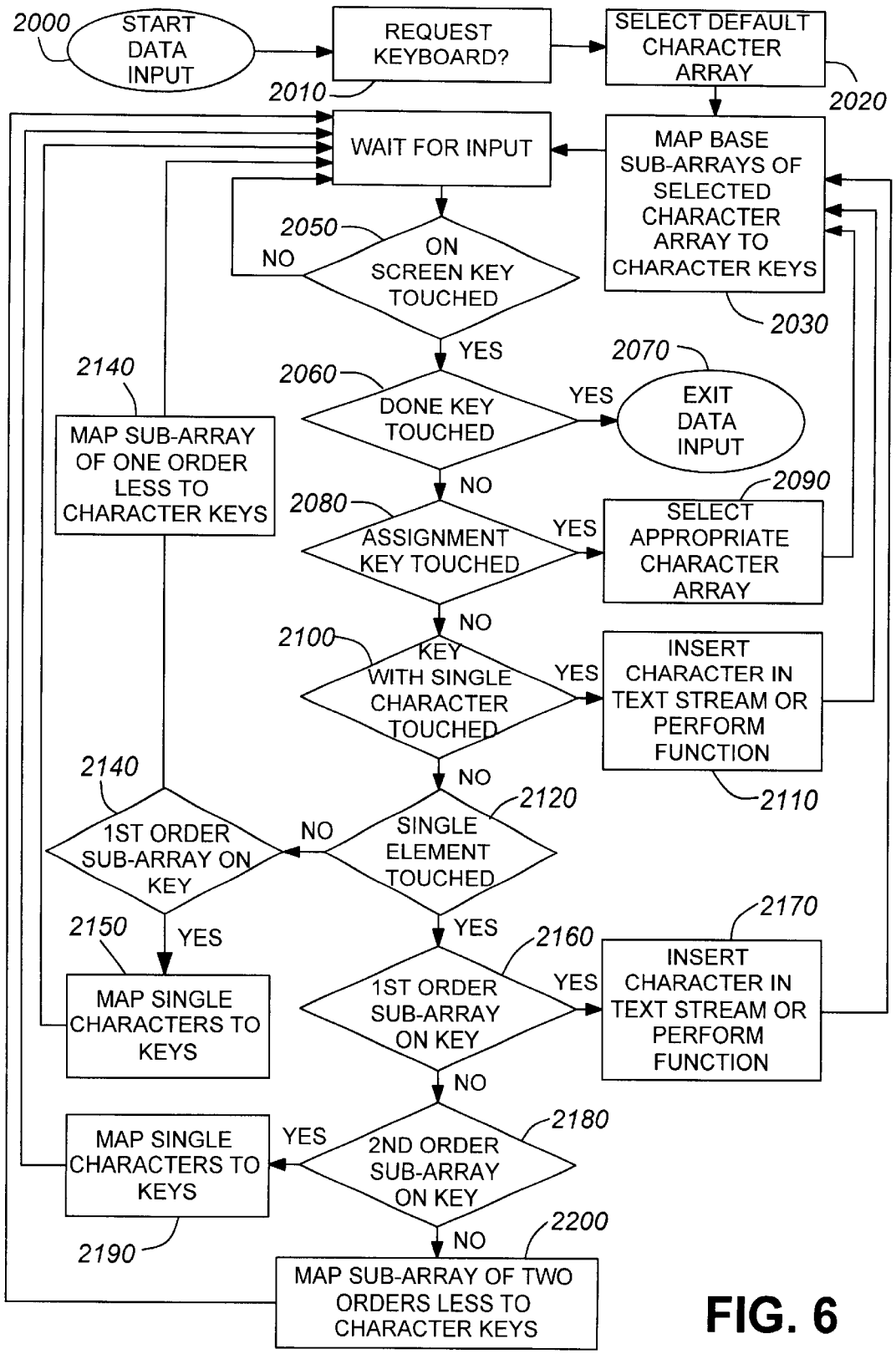
FIG. 6 is a flow diagram illustrating the process carried out by the touch-screen input device software according to an alternate embodiment of the invention.

FIG. 6 is a flow diagram outlining the input steps for the multiple layer input of data. Similar to the discussion of FIG. 3, once the input device is notified that data input facilities are desired 2000, a keyboard is requested 2010, a default character array is selected 2020, and the base sub-arrays of the selected character array (default array initially) are mapped to the character keys 2030. At this point the micro-controller waits for a user input 2040. Upon receiving an input, i.e. the screen is touched, the micro-controller determines if the position of said input corresponds to the position of an on screen key 2050. If the screen was touched in a position which does not represent an on screen key, the micro-controller begins waiting for another user input 2040. However, once a key is selected, the micro-controller proceeds to the next step of determining whether said key which was input was the "done" key 2060. If said key input was the "done" key, the input sequence terminates 2070. Otherwise, the micro-controller must determine whether an assignment key was input 2080. If an assignment key was input, the appropriate character array is selected 2090 and the base sub-arrays of said character array are re-mapped to the character keys 2030. At this stage the input sequence starts over by waiting for a user input 2040. An input of a key other than an assignment key, prompts the micro-controller to determine whether a key with a particular character displayed on it is input 2100. If said determination proves positive, the character displayed on said key is inserted into the character text stream or the function associated with said character is performed 2110. Said character keys are then re-mapped with the base sub-arrays of the selected character array 2030. At this point the input sequence would re-initiate 2040. If particular characters were not displayed on said character keys, the next stage determines whether a single element was input 2120. If this determination is negative, i.e. multiple elements on the same character key were input, the micro-controller then determines whether the displayed sub-arrays were of $1^{st}$ order 2130. If the sub-arrays were of $1^{st}$ order the characters within said sub-array are mapped to the particular character keys 2150. If the sub-arrays were not of $1^{st}$ order, sub-arrays of one order less are mapped to the character keys 2140. Referring back to the single element determination step 2120, if a single element was selected, the micro-controller must then determine if $1^{st}$ order sub-arrays were displayed on said character keys 2160. If said $1^{st}$ order sub-arrays were displayed on said keys, the character displayed on said selected element is inserted into the text stream or the function associated with said character is performed 2170. The character keys are then re-mapped with the selected base sub-arrays 2030, and the input sequence re-initiates 2040. If the sub-arrays were not of $1^{st}$ order the micro-controller determines whether they were of $2^{nd}$ order 2180. If said sub-arrays were of $2^{nd}$ order, the characters within said input elements are mapped to the particular character keys 2190. If said sub-arrays were not of $2^{nd}$ order, i.e. of an order greater than $2^{nd}$, the sub-arrays within the input element (two orders less) are mapped to the character keys 2200, and the input sequence starts over 2040.

Again one should note that the assignment keys are not necessary to the functionality of the invention, but are merely for providing a greater number of available characters. Also as mentioned previously said assignment keys, and said "done" key need not be distinct keys but could be easily represented by a character within the character arrays.

Numerous modifications, variations and adaptations may be made to the particular embodiments of the invention described above without departing from then scope of the invention, which is defined in the claims.

What is claimed is:

1. A method for operating a touch-screen input device including a touch sensitive screen comprising the steps of:

displaying a plurality of input keys on said touch sensitive screen;

mapping a plurality of characters to each input key;

receiving a user input;

determining whether said user input designates a single character;

determining whether said user input designates a re-map command;

selecting said single character responsive to said input designating said single character; and re-mapping said keys responsive to said input designating a re-map command; wherein the step of selecting said single character includes:

inserting an alphanumeric character or symbol into the text stream; or performing the function represented by the selected character representing said function;

wherein said input keys are divided into a plurality of elements; and wherein said mapping step includes initially mapping single characters to particular elements; and wherein said re-map command includes receiving an input of a plurality of elements when single characters are mapped to individual elements; and wherein said re-mapping step includes mapping single characters to input keys; and wherein said input designating a single character includes an input of a particular element when a single character is mapped to said particular element, or an input of any number of elements from the same input key when a single character is mapped to said input key.

2. The method as claimed in claim 1 wherein the number of elements per input key is limited to the total number of input keys and wherein said re-map step includes re-mapping said input keys with the characters which are mapped to said selected input key, wherein each particular input key is re-mapped with the character whose position within said selected input key corresponds to the position of said input keys.

3. A method for operating a touch-screen input device including a touch sensitive screen comprising the steps of:

displaying a plurality of character keys and a plurality of assignment keys on said touch sensitive screen;

mapping a plurality of characters to each character key;

receiving a user input;

determining whether said user input designates a single character;

determining whether said user input designates a re-map command; and selecting said single character responsive to said input designating said single character; and re-mapping said keys responsive to said input designating a re-map command; wherein the step of selecting said single character includes:

inserting an alphanumeric character or symbol into the text stream; or performing the function represented by the selected character representing said function;

wherein said character keys are further divided into a plurality of elements; and wherein said mapping step includes initially mapping single characters to particular elements of said character keys; and wherein said re-map command includes receiving an input of an assignment key or an input of a plurality of elements when single characters are mapped to particular elements; and wherein said re-mapping step includes mapping single character to character keys, and mapping different characters to said elements; and wherein said input designating a single character includes an input of a particular element when single characters are mapped to particular elements or an input of any number of elements from the same character key when a single character is mapped to said character key.

4. The method as claimed in claim 3 wherein the number of elements per character key is limited to the total number of character keys and wherein said re-map step responsive to an input of a plurality of elements includes re-mapping said input keys with the characters which are mapped to said selected input key, wherein each particular input key is re-mapped with the character whose position within said selected input key corresponds to the position of said input keys.

5. A touch-screen device comprising:

a touch-screen;

means for displaying on said touch-screen a plurality of input keys;

means for mapping a plurality of characters to each input key;

means for determining whether said input designates a single character or a re-map command;

means for selecting a single character responsive to an input designating a particular character; and means for re-mapping said input keys responsive to a re-map command input;

wherein said means for selecting a character responsive to an input designating a particular character includes:

means for inserting an alphanumeric character or symbol into the text steam; and means for performing the function represented by the selected character representing said function;

wherein said input keys are divided into a plurality of elements and wherein said means for mapping includes means for initially mapping single characters to particular elements;

wherein said means for determining comprises means for determining whether individual or multiple elements are input;

wherein said means for selecting a character further includes means for selecting a character responsive to an input of a particular element when a single character is mapped to said particular element and means for a character responsive to an input of any number of elements on the same input key when a single character is mapped to particular input key; and wherein said means for re-mapping further includes means for mapping single characters to input keys responsive to an input of a plurality of elements when single characters are mapped to particular elements.

6. A device as claimed in claim 5 wherein the number of elements per input key is limited to the total number of input keys and wherein said re-map command further includes means for re-mapping said input keys with the characters which are mapped to a selected input key, wherein each particular input key is re-mapped with the character whose position within said selected input key corresponds to the position of said input keys.

7. A touch-screen device comprising:

a touch-screen;

means for displaying on said touch-screen a plurality of character keys and a plurality of assignment keys;

means for mapping a plurality of characters to each character key;

means for determining whether said input designates a single character or a re-map command;

means for selecting a character responsive to an input designating a particular character; and means for re-mapping said input keys responsive to a re-map command input;

wherein said means for selecting a character responsive to an input designating a particular character includes:

means for inserting an alphanumeric character or symbol into the text stream; and means for performing the function represented by the selected character representing said function;

wherein said character keys are further divided into plurality of elements wherein said means for mapping includes means for initially mapping single character to particular elements;

wherein said means for determining comprises means for determining whether individual or multiple elements are input;

wherein said means for re-mapping further includes means for mapping single character to character keys responsive to an input of a plurality of elements when single characters are mapped to particular elements; and wherein said means for selecting a character further includes means for selecting a character responsive to an input of a particular element when a single character is mapped to said particular element and means for selecting a character responsive to an input of any number of elements on the same input key when a single character is mapped to a particular input key.

8. A device as claimed in claim 7 wherein the number of elements per character key is limited to the total number of character keys and wherein said re-map command further includes means for re-mapping said character keys with the characters which are mapped to a selected character key, wherein each character key is re-mapped with the character whose position within said selected character key corresponds to the position of said character keys.

9. A method for operating a touch-screen input device including a touch sensitive screen comprising the steps of:

displaying a plurality of input keys on said touch sensitive screen;

mapping a plurality of characters to each input key;

receiving a user input;

determining whether said user input designates a single character;

determining whether said user input designates a re-map command;

selecting said single character responsive to said input designating said single character; and re-mapping said keys responsive to said input designating a re-map command; wherein the step of selecting said single character includes:

inserting an alphanumeric character or symbol into the text stream; or performing the function represented by the selected character representing said function;

wherein said input keys are divided into a plurality of elements wherein said mapping step includes initially mapping single characters or character sub-arrays to particular elements; and wherein said re-map command includes receiving an input of a plurality of elements when single characters or character arrays are mapped to individual elements; and wherein an input designating a single character includes an input of a particular element when a single character is mapped to said particular element or an input of any number of elements on the same input key when a single character is mapped to said particular input key.

10. The method as claimed in claim 9 wherein said re-map command further includes:

re-mapping said input keys with single characters responsive to an input of a plurality of elements on the same input key when first order character sub-arrays are mapped to particular input keys;

re-mapping said input keys with a single character, responsive to an input of a single element when second order character sub-arrays are mapped to particular input keys;

re-mapping said input keys with character sub-arrays of one order less responsive to an input of a plurality of elements on the same input key when character sub-arrays of second order or greater are mapped to particular input keys; and re-mapping said input keys with character sub-arrays of two orders less responsive to an input of a single element when character sub-arrays of third order or greater are mapped to particular input keys.

11. The method as claimed in claim 10 wherein the number of elements per input key is limited to the total number of input keys and wherein said re-map step includes re-mapping said input keys with the characters which are mapped to said selected input key, wherein each particular input key is re-mapped with the character whose position within said selected input key corresponds to the position of said input keys.

12. A method for operating a touch-screen input device including a much sensitive screen comprising the steps of:

displaying a plurality of character keys and a plurality of assignment keys on said touch sensitive screen;

mapping a plurality of characters to each character key;

receiving a user input;

determining whether said user input designates a single character;

determining whether said user input designates a re-map command; and selecting said single character responsive to said input designating said single character; and re-mapping said keys responsive to said input designating a re-map command;

wherein the step of selecting said single character includes:

inserting an alphanumeric character or symbol into the text stream; or performing the function represented by the selected character representing said function;

wherein said character keys are further divided into a plurality of elements wherein said mapping step includes initially mapping single characters or character sub-arrays to particular elements; and wherein said re-map command includes receiving an input of a plurality of elements when single characters or character arrays are mapped to individual elements, or receiving an input of a particular element when character sub-arrays are mapped to individual elements; and wherein an input designating a single character includes an input of a particular element when a single character is mapped to said particular elements or an input of any number of elements on the same character key when a single character is mapped to said particular character key.

13. The method as claimed in claim 12 wherein said re-map command includes:

re-mapping said character keys with single characters responsive to an input of a plurality of elements on the same character key when first order character sub-arrays are mapped to particular character keys;

re-mapping said input keys with a single character, responsive to an input of a single element when second order character sub-arrays are mapped to particular character keys;

re-mapping said character keys with character sub-arrays of one order less responsive to an input of a plurality of elements when character sub-arrays of second order or greater are mapped to particular character keys;

re-mapping said character keys with character sub-arrays of two orders less responsive to an input of a single element when character sub-arrays of third order or greater are mapped to particular character keys; and re-mapping said character keys with character arrays responsive to an assignment key input.

14. The method as claimed in claim 13 wherein the number of elements per character key is limited to the total number of character keys and wherein said re-map step includes re-mapping said character keys with the characters which are mapped to said selected character key, wherein each particular character key is re-mapped with the character whose position within said selected character key corresponds to the position of said character keys.

* * * * *